US012675841B2

(12) United States Patent
Cecen et al.

(10) Patent No.: US 12,675,841 B2
(45) Date of Patent: Jul. 7, 2026

(54) IMAGE STITCHING METHODS AND SYSTEMS

(71) Applicant: ExxonMobil Technology and Engineering Company, Spring, TX (US)

(72) Inventors: Ahmet Cecen, Houston, TX (US); Antonio S. Buono, Spring, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 481 days.

(21) Appl. No.: 18/314,600

(22) Filed: May 9, 2023

(65) Prior Publication Data

US 2023/0385984 A1      Nov. 30, 2023

Related U.S. Application Data

(60) Provisional application No. 63/345,704, filed on May 25, 2022.

(51) Int. Cl.
| | |
|---|---|
| *G06K 9/00* | (2022.01) |
| *G06T 3/4038* | (2024.01) |
| *G06T 5/50* | (2006.01) |

(52) U.S. Cl.
CPC .............. *G06T 3/4038* (2013.01); *G06T 5/50* (2013.01); *G06T 2207/20212* (2013.01)

(58) Field of Classification Search
CPC ..................... G06T 3/4038; G06T 5/50; G06T 2207/20212; G06T 2200/32; H04N 23/698; G06V 10/16
See application file for complete search history.

(56) References Cited

U.S. PATENT DOCUMENTS

| | | | | |
|---|---|---|---|---|
| 10,033,922 | B1 * | 7/2018 | Tanner ................. | H04N 17/002 |
| 11,202,003 | B1 * | 12/2021 | Tanner ................. | H04N 5/2624 |
| 2010/0238164 | A1 * | 9/2010 | Steedly .................. | G06V 10/24 |
| | | | | 345/582 |
| 2013/0329002 | A1 * | 12/2013 | Tico ...................... | G06T 3/4038 |
| | | | | 382/284 |
| 2018/0101934 | A1 * | 4/2018 | Cai ........................... | G06T 7/73 |
| 2018/0268521 | A1 * | 9/2018 | Ding .................... | G06V 10/758 |

* cited by examiner

*Primary Examiner* — Gregory A Morse
*Assistant Examiner* — Owais I Memon
(74) *Attorney, Agent, or Firm* — WOMBLE BOND DICKINSON (US) LLP; Kevin Davis

(57) ABSTRACT

A method of image stitching may include: providing a first image and a second image, wherein the first and second images are neighboring and partially overlapping, wherein the first image comprises a first overlap portion that overlaps with a second overlap portion of the second image; applying a seam algorithm to the first overlap portion and the second overlap portion to produce a stitched overlap portion, wherein the seam algorithm uses an error minimization technique to identify a seam for the first and second overlap portions along which data for each of the first and second overlap portions are similar; replacing the first overlap portion of the first image with the stitched overlap portion to produce a modified first image; and replacing the second overlap portion of the second image with the stitched overlap portion to produce a modified second image.

18 Claims, 5 Drawing Sheets

IMAGE STITCHING METHODS AND SYSTEMS

CROSS-REFERENCE TO RELATED APPLICATION

This application claims the benefit of U.S. Provisional Application Ser. No. 63/345,704, entitled "IMAGE STITCHING METHODS AND SYSTEMS," filed May 25, 2022, the disclosure of which is hereby incorporated by reference in its entirety.

FIELD OF INVENTION

The present disclosure relates to image stitching.

BACKGROUND

Image stitching, or photo stitching, is a process of combining multiple images with overlapping portions of view to produce one large image that has a high resolution. Current stitching software aligns the images in the xy space and then chooses a straight line within the overlap and appends the images along that line. This may be done in both in the horizontal and vertical plane as needed for the stitching requirements.

Most software approaches to stitching require the portions of overlap to be near exact in exposure and other settings to create a seamless, larger image. Where there are edge and corner effects (or seams) from images that do not match up perfectly, some software alters the images where these effects manifest. Example alterations are blending.

State of the art in some applications (such as panorama images) involve altering the original images in some way (e.g., blending) to make the overlapping image more seamless. Because most images are meant to be appealing to the eye, this is not a significant issue. However, when images that are stitched together need to be used for scientific or analytical purposes, data integrity is more important than visual allure. In these instances, edge and corner effects cannot be simply blended away. Rather, the data notably effected by edge and corner effects may be wholly discounted in the scientific analysis because it is scientifically inaccurate. When the features being analyzed are significantly smaller than a single image before stitching, this may not be an issue because each image before stitching may capture a plurality of whole features. Therefore, a statistically relevant number of scientifically accurate features may be captured. However, this is rarely the case because image stitching is typically performed so that features larger than a single image may be analyzed. That is, several high-resolution (e.g., high magnification) images stitched together provide greater detail than a single low resolution (e.g., low magnification) image.

A further issue is that image stitching is memory intensive (e.g., random-access memory or RAM-intensive). Current image stitching software appends a first image with a second image, then a third image, then a fourth image, and so on where the newly created image grows as each image is appended or stitched. This newly created image is what is stored in the computer's RAM. Therefore, the size of the stitched image is limited by the RAM of the computer where the resolution of the individual images determines how many images that can be stitched together before running out of RAM. Again, for scientific analyses, typically high-resolution images are desired, so either the RAM requirements may be extraordinary, or the maximum number of images one can stitch together may be severely limited.

The issues with conventional approaches is further complicated with images that involve large amounts of data, such as seismic images and medical images. These types of data need to maintain resolution on a pixel by pixel basis (e.g., cell by cell basis) and to maintain or honor scientific or analytical integrity of the data. Accordingly, there exists a need for enhanced image processing for such applications.

SUMMARY OF INVENTION

The present disclosure relates to image stitching.

A nonlimiting example method may comprise: providing a first image and a second image, wherein the first and second images are neighboring and partially overlapping, wherein the first image comprises a first overlap portion that overlaps with a second overlap portion of the second image; applying a seam algorithm to the first overlap portion and the second overlap portion to produce a stitched overlap portion, wherein the seam algorithm uses an error minimization technique to identify a seam for the first and second overlap portions along which data for each of the first and second overlap portions are similar; replacing the first overlap portion of the first image with the stitched overlap portion to produce a modified first image; and replacing the second overlap portion of the second image with the stitched overlap portion to produce a modified second image.

Another nonlimiting example method may comprise: providing a plurality of images arranged in two or more rows and two or more columns, wherein neighboring images within the plurality of images partially overlap; applying a seam algorithm to first neighboring images of the plurality of images along a first row of the two or more rows; applying the seam algorithm to second neighboring images of the plurality of images along a second row of the two or more rows, wherein the second row neighbors the first row; applying the seam algorithm third neighboring images of the plurality of images along at least two neighboring columns within the first and second rows; reapplying the seam algorithm to the first neighboring images; and reapplying the seam algorithm to the second neighboring images; and wherein the seam algorithm (a) uses an error minimization technique to identify a seam for the overlapping portions of neighboring images along which data for each of the neighboring images' overlap portions are similar and (b) overwrites at least some of each of the overlapping portions with data from the other overlapping portion.

Another nonlimiting example method may comprise: providing a plurality of images arranged in two or more rows and two or more columns, wherein neighboring images within the plurality of images partially overlap; applying a seam algorithm to first neighboring images of the plurality of images along a first column of the two or more columns; applying the seam algorithm to second neighboring images of the plurality of images along a second column of the two or more columns, wherein the second column neighbors the first column; applying the seam algorithm third neighboring images of the plurality of images along at least two neighboring rows within the first and second columns; reapplying the seam algorithm to the first neighboring images; and reapplying the seam algorithm to the second neighboring images; and wherein the seam algorithm (a) uses an error minimization technique to identify a seam for the overlapping portions of neighboring images along which data for each of the neighboring images' overlap portions are similar and (b) overwrites at least some of each of the overlapping portions with data from the other overlapping portion.

A nonlimiting example system may comprise: a processor; a primary memory component and a secondary memory component each coupled to the processor; and instructions provided to the primary memory component, wherein the instructions are executable by the processor to cause the system to perform a method comprising: recalling a first image and a second image from the secondary memory component to the primary memory component, wherein the first and second images are neighboring and partially overlapping, wherein the first image comprises a first overlap portion that overlaps with a second overlap portion of the second image; performing on the primary memory component: applying a seam algorithm to the first overlap portion and the second overlap portion to produce a stitched overlap portion, wherein the seam algorithm uses an error minimization technique to identify a seam for the first and second overlap portions along which data for each of the first and second overlap portions are similar; replacing the first overlap portion of the first image with the stitched overlap portion to produce a modified first image; replacing the second overlap portion of the second image with the stitched overlap portion to produce a modified second image; and saving the modified first image and the modified second image to the secondary memory component.

These and other features and attributes of the disclosed methods and systems of the present disclosure and their advantageous applications and/or uses will be apparent from the detailed description which follows.

BRIEF DESCRIPTION OF THE DRAWINGS

To assist those of ordinary skill in the relevant art in making and using the subject matter hereof, reference is made to the appended drawings. The following figures are included to illustrate certain aspects of the disclosure and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

Figure 1:
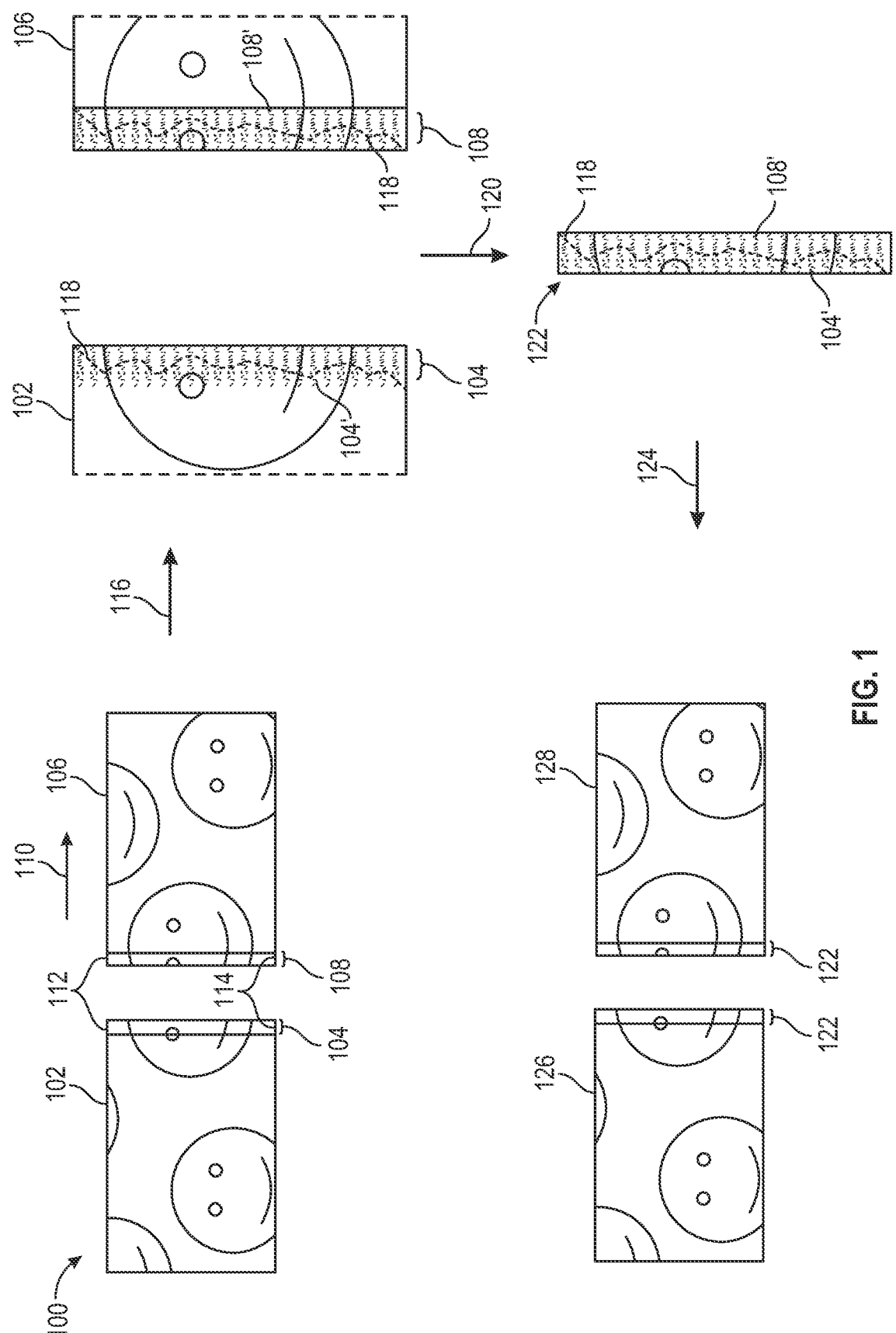
FIG. 1 is a diagram illustrating a stitching method 100 in accordance with the present techniques. In the illustrated stitching method 100, two neighboring and partially overlapping images (first image 102 and second image 106) are considered.

The present disclosure relates to image stitching. Generally, the methods and systems described herein use a seam algorithm to identify a seam along which two neighboring and overlapping images may be stitched without altering pixel data like contrast, resolution, intensity, color, and the like. For example, the seam algorithm may analyze the overlapping portions of neighboring images to identify a seam (or specific path) where the error between the data of the two overlapping portions (e.g., the color, the color intensity, and/or the contrast) is low (preferably minimal). The data from the seam to the edge of each image in the overlapping portions is then deleted (more specifically, overwritten with data from the other image as describe in detail herein). This maintains the number of pixels and does not change the color, contrast, and the like of each pixel. Because pixel data is maintained, a quantitate analysis of composite images may be performed with high fidelity.

Further, the methods and systems described herein apply the seam algorithm to two neighboring and overlapping images that can then be saved separately to a secondary memory component rather than building a composite image in a primary memory component (e.g., random-access memory or RAM). For example, once two images are stitched using the overwriting techniques described herein, the modified images may be saved to a secondary memory component and free up capacity on a primary memory component (e.g., RAM) for processing the next two images. Then, each image may individually be recalled for performing further stitching processes to other neighboring and overlapping images. Advantageously, only two images need to be loaded to primary memory at any given time. Although more can be depending on memory capacity and desired computational speed.

Freeing up capacity in the primary storage component provides two advantages. First, because primary storage component capacity is not devoted to data from stitching the first two images and/or data from a composite image, the stitching process may not be slowed by limited RAM capacity. Second, this data handling technique of saving images to the secondary storage component when not being stitched allows for more images to be stitched together. That is, the number of images that can be stitched together is limited by the capacity of secondary storage component, which is typically significantly larger than the primary storage capacity. For example, if the primary storage component capacity allows for a composite image of two thousand five hundred (2,500) images of a given resolution, then using traditional stitching techniques that build a composite image as you stitch is limited to processing 2,500 images at said resolution. However, because the methods and systems described herein may maintain individual images after performing the stitching described herein on secondary memory components, any number of images, for example over ten thousand (10,000) images, at said resolution may be stitched, provided sufficient secondary memory is provided. Then, composite images may be built on the primary memory component in a size required by the analysis to be performed with a maximum of 2,500 images of the 10,000 images and the area that the composite image covers in the 10,000-image area may be changed to perform analyses on the full image data set. Therefore, data sets with significantly high numbers of images may be processed and analyzed.

FIG. 1 is a diagram illustrating a stitching method 100 of the present disclosure. In the illustrated stitching method 100, two neighboring and partially overlapping images (first image 102 and second image 106) are considered. The first image 102 has an overlap portion 104, and the second image 106 has an overlap portion 108, where the two overlap portions 104 and 108 overlap each other. The stitching direction 110 is the direction in which the second image 106 neighbors the first image. Herein for overlapping portions, edges refer to boundaries of the overlapping portions substantially parallel (e.g., parallel to within about 15° of parallel) to the stitching direction 110 and sides refer to the boundaries of the overlapping portions substantially perpendicular (e.g., perpendicular to within about 15° of perpendicular) to the stitching direction 110. For each image individually, the overlap portion with a specific neighbor may in a range from 95% to 0.01%, but lower ranges of overlap portions may lessen processing. More preferably, the overlap portion with a specific neighbor may be about 15% or less (or about 10% or less, about 5% or less, or about 1% or less, or about 0.1% to about 15%, or about 1% to about 10%, or about 3% to about 10%, or about 1% to about 5%, or about 0.1% to about 5%, or about 0.1% to about 1%) of the area of the image.

The method then applies a seam algorithm 116 to the two overlap portions 104 and 108. The seam algorithm uses an error minimization technique to identify a seam 118 that extends across the two overlap portions 104 and 108 from a starting location to an ending location. The starting and ending locations for the seam 118 should be located at opposing edges 112 and 114 of the two overlap portions 104 and 108. The error minimization technique analyzes the data (e.g., pixel intensity, pixel color, and the like) in the two overlap portions 104 and 108 and identifies the seam such that the data for each of the two overlap portions 104 and 108 along said seam is similar. That is, the error between the data from each of the two overlap portions 104 and 108 along the seam is minimal.

There may be many paths (or candidate paths) along which the seam 118 can be defined where the data for each of the two overlap portions 104 and 108 are similar. Selection of which candidate path to define the seam 118 may be based on, among other things, the length of the path (e.g., short paths may be preferred), the accumulated error along the path, and the like, and any combination thereof. In some instances, multiple paths may fit the selection criteria. In such cases, any of said paths may be selected, for example, at random, the first path to fit the criteria, or some other selection process.

Error in the error minimization technique may be defined as an amount difference in two values. This difference may be calculated as an absolute difference (e.g., x-y), a weighted error (e.g., an exponential error function), and the like.

The seam algorithm may be implemented in many ways. In a first example, the error between the two overlap portions may be determined over the whole overlap area or a portion of the overlap area (e.g., pixel by pixel or defined aggregate of pixels by aggregate of pixels). It should be noted that drift may occur between capturing the neighboring images. Discussion of accounting for drift is provided further herein. Once the overlap area or portion thereof is established and the error calculated, then, the seam algorithm may identify one or more candidate paths from a defined starting location to a defined ending location that maintain the error (e.g., cumulatively and/or at individual error values) within threshold values. Again, the selection of the candidate path to define the seam may be based on, for example, a total accumulated error along the seam, a length of the seam, and the like, and any combination thereof. Conceptually, the whole overlap area error data may be thought of as a topographical map where height (or z-axis) is the amount of error. The one or more candidate paths and, consequently, the seam traverse this topographical map from the defined starting location to the defined ending location along low error values (or low height) and avoid high error values.

In a second example, the seam may be determined by trial and error with thresholds for acceptable error values between the data of each of the two overlap portions (again accounted for drift). In this example, the algorithm may have a set starting location and a set ending location for the path. From the starting location, the algorithm identifies a next location on a candidate path (e.g., a neighboring pixel or an aggregate of neighboring pixels) as a neighboring location with an error value within a threshold limit and being in a direction most direct towards the ending location. The candidate path is built by sequential performing this analysis. If a dead end is reached before reaching the ending location, the same algorithm may back track along the candidate path (e.g., back one to ten locations) and then begin again knowing the location of the encountered high error (that is, error outside the threshold) should be avoided. Once a candidate path reaches the ending location, said path becomes the seam. In this example, the seam may not have the lowest accumulated error or be the shortest possible path, but rather the first path to connect the starting and ending points where each location along the path is within the threshold error.

Generally, the seam produced is typically non-linear, meaning that the seam is typically not linear from the starting location to the ending location. Rather, at least a portion of the seam is non-linear. As used herein, the term "non-linear seam" refers to a seam with at least a portion of the seam being non-linear.

Referring again to FIG. 1, once a seam 118 is identified, the two overlap portions 104 and 106 are stitched 120 together to produce a stitched overlap 122. More specifically, a portion 104' of the overlap portion 104 of the first image 102 that is contiguous with the rest of the first image 102 up to the seam 118 and a portion 108' of the overlap portion 108 of the second image 106 that is contiguous with the rest of the second image 106 up to the seam 118 are stitched together at the seam 118 to produce the stitched overlap 122.

The stitched overlap 122 is then used to overwrite 124 the two overlap portions 104 and 106 in the respective first and second images 102 and 106 to produce modified first image 126 and modified second image 128. The modified first and second images 126 and 128 are then maintained as separate images that may be electronically stored along with the location information for each of said images 126 and 128. Accordingly, production of the stitched image may include retrieving said images 126 and 128 from electronic storage and arranging said images 126 and 128 according to the location information to produce a composite image (not illustrated).

Electronic storage may be in a primary memory component and/or a secondary memory component. Examples of primary memory components may include, but are not limited to, read only memory (ROM), random access memory (RAM), cache memory, and the like. Examples of secondary memory components may include, but are not limited to, flash memory, magnetic storage, optical storage, online cloud system storage. Because the modified first and second images 126 and 128 can be stored on secondary memory components, stitching of other images may be performed using primary memory without the complications of said images 126 and 128 taking up primary memory capacity. Accordingly, the stitching method may be executed (a) more quickly because RAM capacity is not being used on images not being stitched and/or (b) on a greater number of total individual images used to create a composite image or portion thereof because the RAM usage is dedicated to fewer images (preferably only two images) at a time rather than all images in the composite image.

Figure 2A:
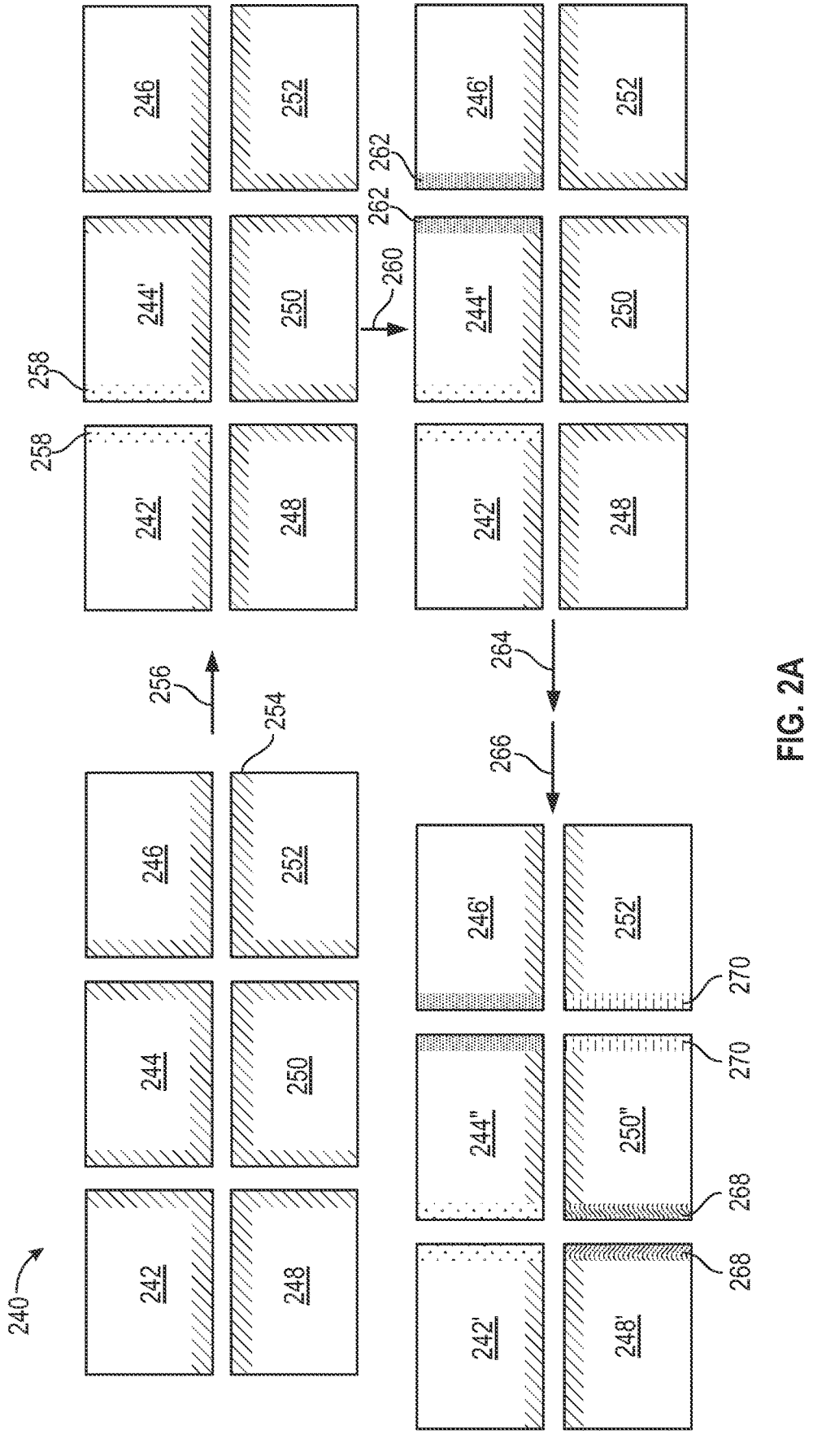
FIGS. 2A and 2B illustrate a method for stitching together six images.
Figure 2B:
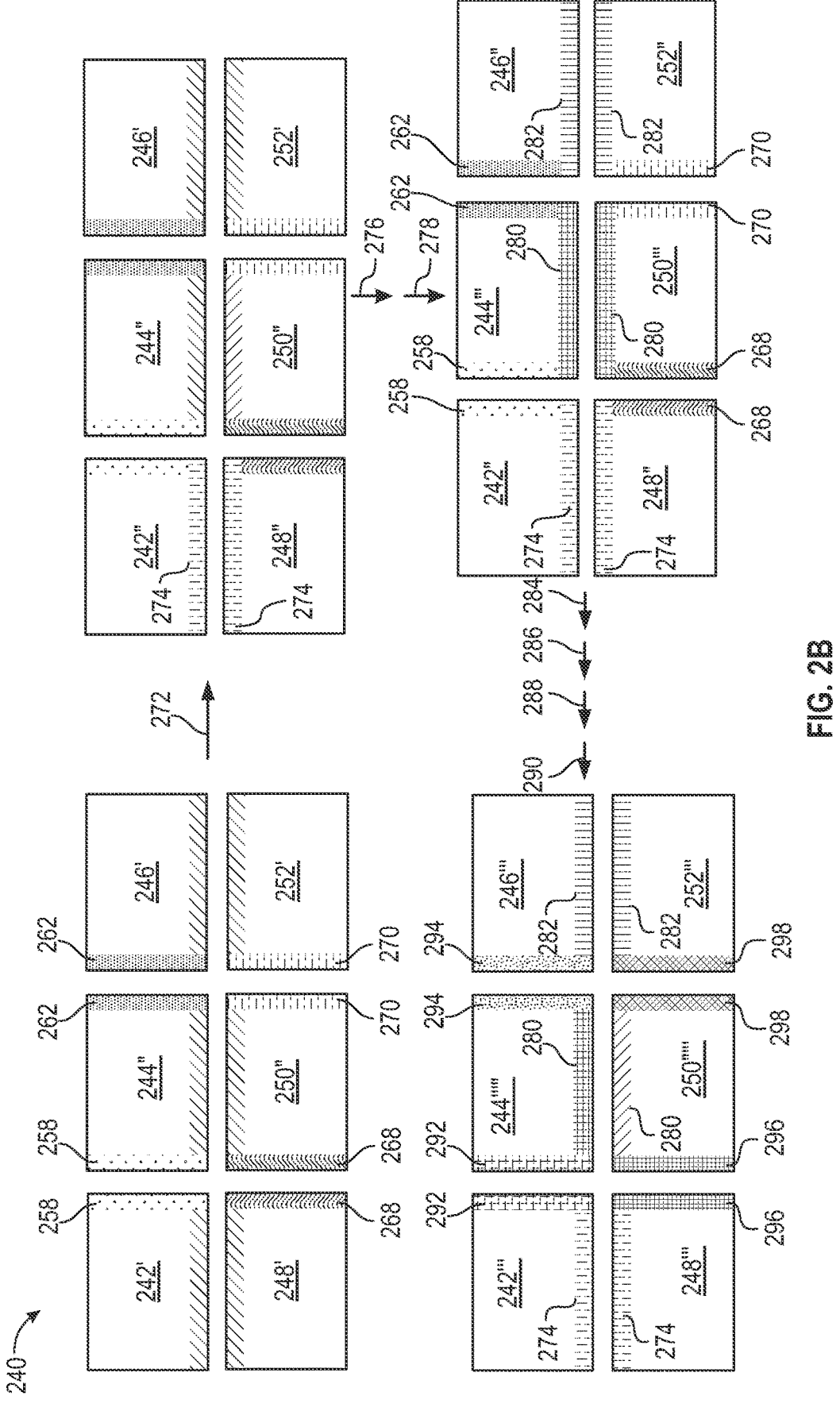

The stitching method described in FIG. 1 may be used for stitching together neighboring and partially overlapping images that are part of a larger composite image. FIGS. 2A and 2B illustrate a method for stitching several images together.

The method 240 illustrated in FIGS. 2A and 2B stitches together six images 242, 244, 246, 248, 250, and 252. The six images are three wide (akin to three columns) and two high (akin to two rows) and each having overlapping portions 254 with their neighboring images. In this illustrated method, the stitching method 240 first stitches neighboring images along the top row, then along the bottom row, and then down the column. In a first stitch, images 242 and 244, the first two images in the top row, are stitched 256 together according to a method described herein, where their overlapping portions 254 are overwritten with a first stitched overlap 258 to produce once modified image 242' and once modified image 244'. Then, images 244' and 246, the second (having been already modified) and third images in the top row, are stitched 260 together according to a method described herein, where their overlapping portions 254 are overwritten with a second stitched overlap 262 to produce twice modified image 244" and once modified image 246'. Then, stitching 264 and 266 is performed twice again on the second row of images, specifically, (a) on images 248 and 250, the first two images on the bottom row, to produce once modified image 248' and once modified image 250' each having their corresponding overlapped portions 254 overwritten with a third stitched overlap 268 and (b) on images 250' and 252, the second (having been already modified) and third images in the bottom row, to produce twice modified image 250" and once modified image 252' each having their corresponding overlapped portions 254 overwritten with a third stitched overlap 270. For this 6-image example, that completes the stitching in the horizontal (or row) direction.

Then, stitching is performed in the vertical (or column) direction on neighboring images. In the illustrated example, images 242' and 248', the two images in the first column both having been once modified, are stitched 272 together to yield a fifth stitched overlap 274 that is used to overwrite the overlap portion 254 of each of the image to produce twice modified image 242" and twice modified image 248". It should be noted that the stitching is performed on the entire area including the original data in the overlap portion 254 and the overwritten portion of the original overlap portion 254 from each of the two images 242' and 248' to yield a fifth stitched overlap 274. Two additional stitching procedures 276 and 278 are performed on the respective columns to produce (a) thrice modified image 244" and thrice modified image 250"' that each include sixth stitched overlap 280 and (b) twice modified image 246" and twice modified image 252" that each include seventh stitched overlap 282.

To account for the corners, the horizontal (or row) direction stitching is performed a second time. For example, in this illustrated example of FIGS. 2A and 2B, stitching 284, 286, 288, and 290 is performed four more times to produce in series (a) thrice modified image 242" and four-times modified image (not illustrated) from thrice modified image 244" that each include eighth stitched overlap 292, (b) five-times modified image 294' and thrice modified image 246" that each include ninth stitched overlap 294, (c) thrice modified image 248" and four-times modified image (not illustrated) from thrice modified image 250"' that each include tenth stitched overlap 296, and (d) five-times modified image 250"" and thrice modified image 252"' that each include eleventh stitched overlap 298. Because the corner data in twice modified image 242" is the same as the corner data of twice modified 248" and the corner data for thrice modified image 244"' is the same as the corner data of thrice modified image 250"', the stitching of (a) twice modified image 242" and thrice modified image 244"' and the stitching of (b) twice modified 248" and thrice modified image 250"' yields the same corner data for where each of the four images overlap. The secondary horizontal stitching can be performed on the originally identified overlap areas, or any portion thereof, that correspond to overlapping corners.

In this example, only six images are processed, so the method may be performed wholly on primary memory components with little to no effect on processing speed. However, for methods with more images, the images and images modified at any iteration may be stored on a secondary memory component, recalled to a primary memory component for a stitching procedure, and the newly modified image save back to the secondary memory component for recall as needed for additional stitching procedures or for building a composite image.

The method 240 illustrated in FIGS. 2A and 2B perform a horizontal (or row) stitching, then a vertical (or column) stitching, and then repeats the horizontal (or row) stitching. Alternative methods may perform a vertical (or column) stitching, then a horizontal (or row) stitching, and then repeats the vertical (or column) stitching. It should be noted that stitching does not have to be such that all images are stitched in a first direction (horizontal or vertical), all images are stitched in a second direction (vertical or horizontal), and then again all images are stitched in the first direction (horizontal or vertical). Rather, images relative to a specific corner where four images overlap should be performed stitched in a first direction (horizontal or vertical), in a second direction (vertical or horizontal), and then again in the first direction (horizontal or vertical). This ensures the corner effects are accounted for. Selection of the first stitching direction (horizontal or vertical) may be based on the order in which the images were acquired where if images were acquired row by row (horizontal direction first) then stitching may preferably first be in the horizontal direction.

Figure 3:
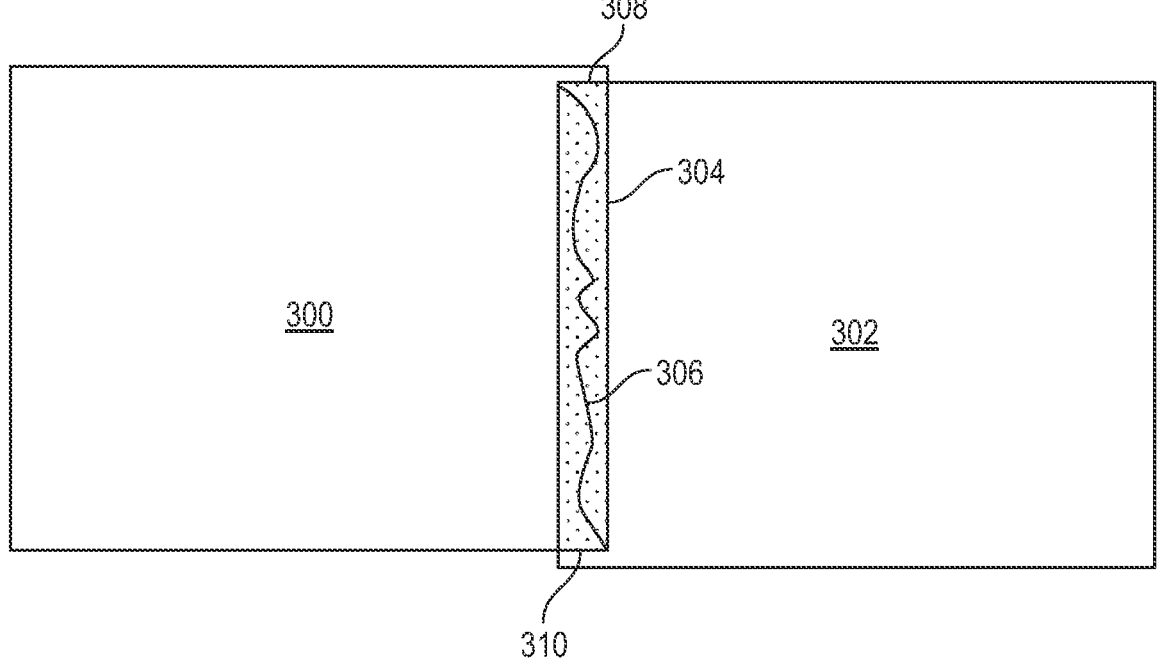
FIG. 3 shows to neighboring and partially overlapping images where the overlapping portion may be used in the stitching methods described herein.

It is recognized that drift may occur when acquiring images. The location of the images should account for drift. Accordingly, two neighboring images may not overlap exactly. The stitching methods described herein are performed on the overlapping portions of neighboring images. FIG. 3 illustrates two neighboring and partially overlapping images 300 and 302 where the overlapping portion 304 would be used in the stitching methods described herein (e.g., to produce stitch 306 (and/or multiple candidate paths for the stitch 306) extending from opposing edges 308 and 310 of the overlapping portion 304). The neighboring and partially overlapping images may be aligned, for example based on actual data contained in the overlapping portions rather than actual coordinates to account for drift (described further below).

As described herein, each image has associated therewith location data. The location data may be where the image is located in the composite image, where the image is located relative to one or more other images, and the like, and any combination thereof. The location data may, for example, be column and line numbers with any relevant offset and/or drift and/or overlap data, coordinates, and the like, and any combination thereof. The location data may be stored with the image, in a database, and/or in any other suitable location so that stitching method may position (and retrieve, if necessary) the proper images in the proper locations and the formation of a composite image may position (and retrieve, if necessary) the proper images in the proper locations.

Forming a composite image may use all of the images or a portion of the images that are in an area of interest or provide an appropriate size scale for the feature analysis of interest. For example, a data set with 10,000 images (e.g., one hundred (100) images by 100 images square) may be stitched together by the methods described herein. Then, the data set may be viewed and/or analyzed in several composite images of ten (10) images by 10 images. In this example, features that span 3 images in one direction and one image in a second direction may be of interest. Accordingly, the composite images of 10 images by 10 images may be sufficiently large to view the details of said features irrespective of the orientation of the features. Because the data is not manipulated (e.g., blurred or stretched) for aesthetic reasons but rather stitched without altering the dimensions, resolution, contrast, or the like of the original data (maintaining pixel fidelity), a quantitate analysis of composite images may be performed with high fidelity.

The stitching methods and systems described herein may be applied data sets having two or more images (or 100 or more images, or one thousand (1,000) or more images, or 10,000 or more images, or 100,000 or more images, or 1,000,000 or more images, or 2 to 1,000,000 or more images, or 100 to 1,000,000 or more images, or 1,000 to 1,000,000 or more images, or 10,000 to 1,000,000 or more images, or 100,000 to 1,000,000 or more images). The upper limit of images depends on the amount of memory in the secondary memory component. The improvement in the functioning of the primary memory component may be observed with data sets having as few as 100 images (e.g., for very high-resolution images). The stitching methods and systems described herein may be applied data sets having two or more images.

The stitching methods and systems described herein may be applied data sets from a variety of sources. Examples of data set sources may include, but are not limited to, scanning electron micrograph images, transmission electron micrograph images, optical micrograph images, geospatial images, aerial images, or satellite images. Examples of types of images in the data set may include, but are not limited to, optical images, infrared images, Doppler images, thermal images, x-ray images, magnetic resonance images, logging data, seismic, ultrasound images, or any data that can be arranged in a 2D grid or matrix such that data in any one location has a spatial relationship relative to its positioning in the grid (e.g., two neighboring points in the grid represent two neighboring entities or locations in the original source from which the data was collected).

Various aspects of the systems and methods described herein utilize computer systems. Such systems and methods can include a non-transitory computer readable medium containing instructions that, when implemented, cause one or more processors to carry out the methods described herein.

"Computer-readable medium" or "non-transitory, computer-readable medium," as used herein, refers to any non-transitory storage and/or transmission medium that participates in providing instructions to a processor for execution. Such a medium may include, but is not limited to, non-volatile media and volatile media. Non-volatile media includes, for example, NVRAM, or magnetic or optical disks. Volatile media includes dynamic memory, such as main memory. Common forms of computer-readable media include, for example, a floppy disk, a flexible disk, a hard disk, an array of hard disks, a magnetic tape, or any other magnetic medium, magneto-optical medium, a CD-ROM, a holographic medium, any other optical medium, a RAM, a PROM, and EPROM, a FLASH-EPROM, a solid state medium like a memory card, any other memory chip or cartridge, or any other tangible medium from which a computer can read data or instructions. When the computer-readable media is configured as a database, it is to be understood that the database may be any type of database, such as relational, hierarchical, object-oriented, and/or the like. Accordingly, exemplary embodiments of the present systems and methods may be considered to include a tangible storage medium or tangible distribution medium and prior art-recognized equivalents and successor media, in which the software implementations embodying the present techniques are stored.

The methods described herein can be performed using computing devices or processor-based devices that include a processor; a memory coupled to the processor; and instructions provided to the memory, wherein the instructions are executable by the processor to perform the methods described herein. The instructions can be a portion of code on a non-transitory computer readable medium. Any suitable processor-based device may be utilized for implementing all or a portion of embodiments of the present techniques, including without limitation personal computers, networks of personal computers, laptop computers, computer workstations, mobile devices, multi-processor servers or workstations with (or without) shared memory, high performance computers, and the like. Moreover, embodiments may be implemented on application specific integrated circuits (ASICs) or very large scale integrated (VLSI) circuits.

For example, a system may comprise: a processor; a primary memory component and a secondary memory component each coupled to the processor; and instructions provided to the primary memory component, wherein the instructions are executable by the processor to cause the system to perform a method comprising: recalling a first image and a second image from the secondary memory component to the primary memory component, wherein the first and second images are neighboring and partially overlapping, wherein the first image comprises a first overlap portion that overlaps with a second overlap portion of the second image; performing on the primary memory component: applying a seam algorithm to the first overlap portion and the second overlap portion to produce a stitched overlap portion, wherein the seam algorithm uses an error minimization technique to identify a seam for the first and second overlap portions along which data for each of the first and second overlap portions are similar; replacing the first overlap portion of the first image with the stitched overlap portion to produce a modified first image; replacing the second overlap portion of the second image with the stitched overlap portion to produce a modified second image; and saving the modified first image and the modified second image to the secondary memory component.

In another example, a system may comprise: a processor; a primary memory component and a secondary memory component each coupled to the processor; and instructions provided to the primary memory component, wherein the instructions are executable by the processor to cause the system to perform a method comprising: recalling from the secondary memory component a plurality of images arranged in two or more rows and two or more columns, wherein neighboring images within the plurality of images partially overlap; performing on the primary memory component: applying a seam algorithm to first neighboring images of the plurality of images along a first row of the two or more rows; applying the seam algorithm to second neighboring images of the plurality of images along a second row of the two or more rows, wherein the second row neighbors the first row; applying the seam algorithm third neighboring images of the plurality of images along at least two neighboring columns within the first and second rows; reapplying the seam algorithm to the first neighboring images; and reapplying the seam algorithm to the second neighboring images; and wherein the seam algorithm (a) uses an error minimization technique to identify a seam for the overlapping portions of neighboring images along which data for each of the neighboring images' overlap portions are similar and (b) overwrites at least some of each of the overlapping portions with data from the other overlapping portion.

In yet another example, a system may comprise: a processor; a primary memory component and a secondary memory component each coupled to the processor; and instructions provided to the primary memory component, wherein the instructions are executable by the processor to cause the system to perform a method comprising: recalling from the secondary memory component a plurality of images arranged in two or more rows and two or more columns, wherein neighboring images within the plurality of images partially overlap; performing on the primary memory component: applying a seam algorithm to first neighboring images of the plurality of images along a first column of the two or more columns; applying the seam algorithm to second neighboring images of the plurality of images along a second column of the two or more columns, wherein the second column neighbors the first column; applying the seam algorithm third neighboring images of the plurality of images along at least two neighboring rows within the first and second columns; reapplying the seam algorithm to the first neighboring images; and reapplying the seam algorithm to the second neighboring images; and wherein the seam algorithm (a) uses an error minimization technique to identify a seam for the overlapping portions of neighboring images along which data for each of the neighboring images' overlap portions are similar and (b) overwrites at least some of each of the overlapping portions with data from the other overlapping portion Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

ADDITIONAL EMBODIMENTS

Embodiment 1. A method comprising: providing a first image and a second image, wherein the first and second images are neighboring and partially overlapping, wherein the first image comprises a first overlap portion that overlaps with a second overlap portion of the second image; applying a seam algorithm to the first overlap portion and the second overlap portion to produce a stitched overlap portion, wherein the seam algorithm uses an error minimization technique to identify a seam for the first and second overlap portions along which data for each of the first and second overlap portions are similar; replacing the first overlap portion of the first image with the stitched overlap portion to produce a modified first image; and replacing the second overlap portion of the second image with the stitched overlap portion to produce a modified second image.

Embodiment 2. The method of Embodiment 1 further comprising: moving the modified first image to a secondary memory component; providing a third image, wherein the second and third images are neighboring and partially overlap, wherein the modified second image comprises a third overlap portion that overlaps with a fourth overlap portion of the third image; applying the seam algorithm to the third overlap portion and the fourth overlap portion to produce a second stitched overlap portion; replacing the third overlap portion of the modified second image with the second stitched overlap portion to produce a twice modified second image; and replacing the fourth overlap portion of the third image with the second stitched overlap portion to produce a modified third image.

Embodiment 3. The method of any preceding Embodiment, wherein the first overlap portion is 15% or less of the area of the first image.

Embodiment 4. The method of any preceding Embodiment, wherein the first and second images are part of a data set that comprises: scanning electron micrograph images, transmission electron micrograph images, optical micrograph images, geospatial images, aerial images, or satellite images.

Embodiment 5. The method of any preceding Embodiment, wherein the first and second images are part of a data set that comprises: optical images, infrared images, Doppler images, thermal images, x-ray images, magnetic resonance images, or ultrasound images.

Embodiment 6. The method of any preceding Embodiment, wherein the first and second images are part of a data set that comprises 100 or more images.

Embodiment 7. The method of any preceding Embodiment, wherein the first and second images are part of a data set that comprises 10,000 or more images.

Embodiment 8. The method of any preceding Embodiment further comprising: before the applying of the seam algorithm, aligning the first overlap portion and the second overlap portion based on data of said portions to account for drift.

Embodiment 9. A method comprising: providing a plurality of images arranged in two or more rows and two or more columns, wherein neighboring images within the plurality of images partially overlap; applying a seam algorithm to first neighboring images of the plurality of images along a first row of the two or more rows; applying the seam algorithm to second neighboring images of the plurality of images along a second row of the two or more rows, wherein the second row neighbors the first row; applying the seam algorithm third neighboring images of the plurality of images along at least two neighboring columns within the first and second rows; reapplying the seam algorithm to the first neighboring images; and reapplying the seam algorithm to the second neighboring images; and wherein the seam algorithm (a) uses an error minimization technique to identify a seam for the overlapping portions of neighboring images along which data for each of the neighboring images' overlap portions are similar and (b) overwrites at least some of each of the overlapping portions with data from the other overlapping portion.

Embodiment 10. The method of Embodiment 9, wherein the first neighboring images have first corresponding overlap portions, wherein the second neighboring images have second corresponding overlapping portions, wherein the third neighboring images have third corresponding overlap portions, and wherein the method further comprises one or more of (a), (b), or (c): (a) before the applying of the seam algorithm to the first neighboring images, aligning the first corresponding overlap portions based on data of the first corresponding overlap portions to account for drift; (b) before the applying of the seam algorithm to the second neighboring images, aligning the second corresponding overlap portions based on data of the second corresponding overlap portions to account for drift; and (c) before the applying of the seam algorithm to the third neighboring images, aligning the third corresponding overlap portions based on data of the third corresponding overlap portions to account for drift.

Embodiment 11. A method comprising: providing a plurality of images arranged in two or more rows and two or more columns, wherein neighboring images within the plurality of images partially overlap; applying a seam algorithm to first neighboring images of the plurality of images along a first column of the two or more columns; applying the seam algorithm to second neighboring images of the plurality of images along a second column of the two or more columns, wherein the second column neighbors the first column; applying the seam algorithm third neighboring images of the plurality of images along at least two neighboring rows within the first and second columns; reapplying the seam algorithm to the first neighboring images; and reapplying the seam algorithm to the second neighboring images; and wherein the seam algorithm (a) uses an error minimization technique to identify a seam for the overlapping portions of neighboring images along which data for each of the neighboring images' overlap portions are similar and (b) overwrites at least some of each of the overlapping portions with data from the other overlapping portion.

Embodiment 12. The method of Embodiment 11, wherein the first neighboring images have first corresponding overlap portions, wherein the second neighboring images have second corresponding overlapping portions, wherein the third neighboring images have third corresponding overlap portions, and wherein the method further comprises one or more of (a), (b), or (c): (a) before the applying of the seam algorithm to the first neighboring images, aligning the first corresponding overlap portions based on data of the first corresponding overlap portions to account for drift; (b) before the applying of the seam algorithm to the second neighboring images, aligning the second corresponding overlap portions based on data of the second corresponding overlap portions to account for drift; and (c) before the applying of the seam algorithm to the third neighboring images, aligning the third corresponding overlap portions based on data of the third corresponding overlap portions to account for drift.

Embodiment 13. A system comprising: a processor; a primary memory component and a secondary memory component each coupled to the processor; and instructions provided to the primary memory component, wherein the instructions are executable by the processor to cause the system to perform a method comprising: recalling a first image and a second image from the secondary memory component to the primary memory component, wherein the first and second images are neighboring and partially overlapping, wherein the first image comprises a first overlap portion that overlaps with a second overlap portion of the second image; performing on the primary memory component: applying a seam algorithm to the first overlap portion and the second overlap portion to produce a stitched overlap portion, wherein the seam algorithm uses an error minimization technique to identify a seam for the first and second overlap portions along which data for each of the first and second overlap portions are similar; replacing the first overlap portion of the first image with the stitched overlap portion to produce a modified first image; replacing the second overlap portion of the second image with the stitched overlap portion to produce a modified second image; and saving the modified first image and the modified second image to the secondary memory component.

Embodiment 14. The system of Embodiment 13, wherein the method further comprises: moving the modified first image to the secondary memory component; recalling a third image from the secondary memory component, wherein the second and third images are neighboring and partially overlap, wherein the modified second image comprises a third overlap portion that overlaps with a fourth overlap portion of the third image; performing on the primary memory component: applying the seam algorithm to the third overlap portion and the fourth overlap portion to produce a second stitched overlap portion; replacing the third overlap portion of the modified second image with the second stitched overlap portion to produce a twice modified second image; and replacing the fourth overlap portion of the third image with the second stitched overlap portion to produce a modified third image.

Embodiment 15. The system of any of Embodiments 13 or 14, wherein the first overlap portion is 15% or less of the area of the first image.

Embodiment 16. The system of any of Embodiments 13 to 15, wherein the first and second images are part of a data set that comprises: scanning electron micrograph images, transmission electron micrograph images, optical micrograph images, geospatial images, aerial images, or satellite images.

Embodiment 17. The system of any of Embodiments 13 to 16, wherein the first and second images are part of a data set that comprises: optical images, infrared images, Doppler images, thermal images, x-ray images, magnetic resonance images, or ultrasound images.

Embodiment 18. The system of any of Embodiments 13 to 17, wherein the first and second images are part of a data set that comprises 100 or more images.

Embodiment 19. The system of any of Embodiments 13 to 18, wherein the first and second images are part of a data set that comprises 10,000 or more images.

Embodiment 20. The system of any of Embodiments 13 to 19, wherein the method further comprises: performing on the primary memory component: before the applying of the seam algorithm, aligning the first overlap portion and the second overlap portion based on data of said portions to account for drift.

To facilitate a better understanding of the embodiments of the present invention, the following examples of preferred or representative embodiments are given. In no way should the following examples be read to limit, or to define, the scope of the invention.

EXAMPLES

Figure 4:
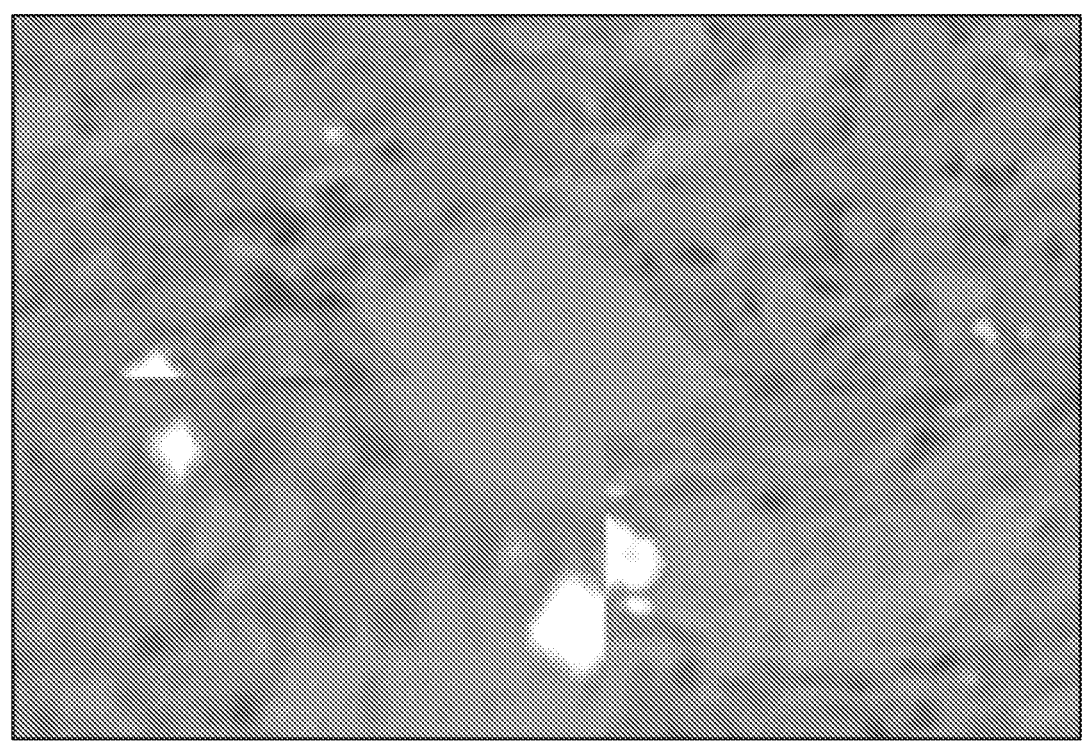
FIG. 4 illustrates four images (two images by two images) stitched together using linear algorithms to produce a single image.
Figure 5:
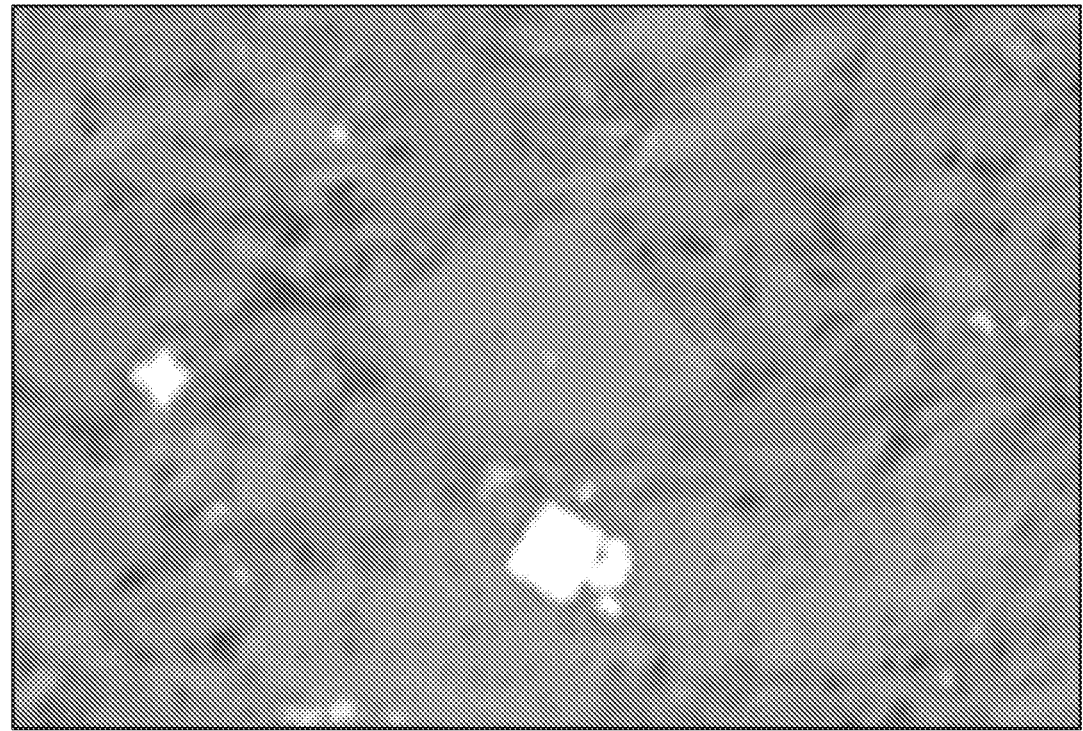
FIG. 5 illustrates the same four images (two images by two images) of FIG. 4 stitched together using non-linear algorithms described herein to produce a single image.

FIG. 4 illustrates 4 images (2 images by 2 images) stitched together using linear algorithms to produce a single image. FIG. 5 illustrates the same 4 images (2 images by 2 images) of FIG. 4 stitched together using non-linear algorithms described herein to produce a single image. FIG. 4 clearly shows edge and corner effect. For example, the left portion of the single image shows half of a diamond-shaped grain structure and just below that, completely captured in the bottom left image of the 4 images stitched a full diamond-shaped grain structure. Questions arise about if there are two diamond-shaped grains there or just one. FIG. 5 using the non-linear stitching described herein shows that there is a single diamond-shaped grain structure. A similar situation is observed for the diamond-shaped grain structure that overlaps the bottom left and bottom right images.

Also, the central grain structure is partially captured by each of the 4 images. The central grain structure FIG. 4 clearly has a disjointed boundary, especially with how the bottom right image appears to be severely misplaced relative to the other images. In contrast, FIG. 5 has a central grain structure with boundaries that appear continuous and not disjointed.

The present techniques may be utilized to enhance hydrocarbon management. Hydrocarbon management or managing hydrocarbons includes any one or more of the following: hydrocarbon extraction; hydrocarbon production, (e.g., drilling a well and prospecting for, and/or producing, hydrocarbons using the well; and/or, causing a well to be drilled to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.). Hydrocarbon management may include seismic simulation and/or seismic acquisition design. For example, prior to conducting a seismic survey, a simulation study may be conducted for sensitivity analytics (e.g., to determine whether or not a change in the subsurface rock or fluid properties at a target location may create a detectable change in recorded seismic data). Hydrocarbon management may include business decisions based on seismic simulation and/or seismic acquisition design. For example, business decisions may include whether or not to acquire more seismic data, and/or value rankings of existing and/or proposed datasets.

To perform the hydrocarbon management, the images associated with the subsurface, such as seismic images and logging images may be processed with the present techniques, which may be used to maintain resolution on a pixel by pixel basis and to honor scientific or analytical integrity of the geophysical or subsurface data. That is, geophysical or subsurface data (e.g., acquired seismic data, reservoir surveillance data, acquired log data, etc.) may be analyzed to develop subsurface models, which may be through inversion processes or processing of logs. For example, the present techniques may be utilized to providing a first seismic image and a second seismic image, wherein the first and second seismic images are neighboring and partially overlapping, wherein the first seismic image comprises a first overlap portion that overlaps with a second overlap portion of the second seismic image; applying a seam algorithm to the first overlap portion and the second overlap portion to produce a stitched overlap portion, wherein the seam algorithm uses an error minimization technique to identify a seam for the first and second overlap portions along which data for each of the first and second overlap portions are similar; replacing the first overlap portion of the first seismic image with the stitched overlap portion to produce a modified first image; and replacing the second overlap portion of the second seismic image with the stitched overlap portion to produce a modified second image.

In addition, the present techniques may be utilized to enhance medical operations. Medical operations include any one or more of the following: obtaining medical images, processing medical images, and performing treatment based on the medical operations. The medical images may include X-ray data; computed tomography data; magnetic resonance imaging data; ultrasound data; nuclear medicine imaging data, and positron-emission tomography (PET) data.

To perform the medical operations, the images associated with the subsurface, such as seismic images and logging images may be processed with the present techniques, which may be used to maintain resolution on a pixel by pixel basis and to honor scientific or analytical integrity of the medical imagery data. For example, the present techniques may be utilized to providing a first medical image and a second medical image, wherein the first and second medical images are neighboring and partially overlapping, wherein the first medical image comprises a first overlap portion that overlaps with a second overlap portion of the second medical image; applying a seam algorithm to the first overlap portion and the second overlap portion to produce a stitched overlap portion, wherein the seam algorithm uses an error minimization technique to identify a seam for the first and second overlap portions along which data for each of the first and second overlap portions are similar; replacing the first overlap portion of the first medical image with the stitched overlap portion to produce a modified first image; and replacing the second overlap portion of the second medical image with the stitched overlap portion to produce a modified second image.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces.

The invention claimed is:

1. A method comprising:
providing a plurality of images arranged in two or more rows and two or more columns, wherein neighboring images within the plurality of images partially overlap;
applying a seam algorithm to first neighboring images of the plurality of images along a first row of the two or more rows or a first column of the two or more columns, wherein the seam algorithm (a) uses an error minimization technique to identify a non-linear seam for the overlapping portions of neighboring images along which data for each of the neighboring images' overlap portions are similar and (b) overwrites at least some of each of the overlapping portions with data from the other overlapping portion to generate modified neighboring and partially overlapping images;
applying the seam algorithm to second neighboring images of the plurality of images along a second row of the two or more rows or a second column of the two or more columns, wherein the second row neighbors the first row or the second column neighbors the first column;
applying the seam algorithm to third neighboring images of the plurality of images along at least two neighboring columns within the first and second rows or along at least two neighboring rows within the first and second columns;
reapplying the seam algorithm to the first neighboring images; and
reapplying the seam algorithm to the second neighboring images.

2. The method of claim 1, wherein the overlapping portions are 15% or less of the area of a neighboring image.

3. The method of claim 1, wherein the plurality of images are part of a data set that comprises: scanning electron micrograph images, transmission electron micrograph images, optical micrograph images, geospatial images, aerial images, or satellite images.

4. The method of claim 1, wherein the plurality of images are part of a data set that comprises: optical images, infrared images, Doppler images, thermal images, x-ray images, magnetic resonance images, or ultrasound images.

5. The method of claim 1, wherein the plurality of images are part of a data set that comprises 100 or more images.

6. The method of claim 1, wherein the plurality of images are part of a data set that comprises 10,000 or more images.

7. The method of claim 1 further comprising:
before the applying of the seam algorithm, aligning the overlapping portions based on data of said portions to account for drift.

8. A method comprising:
providing a plurality of images arranged in two or more rows and two or more columns, wherein neighboring images within the plurality of images partially overlap;
applying a seam algorithm to first neighboring images of the plurality of images along a first row of the two or more rows;
applying the seam algorithm to second neighboring images of the plurality of images along a second row of the two or more rows, wherein the second row neighbors the first row;
applying the seam algorithm to third neighboring images of the plurality of images along at least two neighboring columns within the first and second rows;
reapplying the seam algorithm to the first neighboring images; and
reapplying the seam algorithm to the second neighboring images; and
wherein the seam algorithm (a) uses an error minimization technique to identify a non-linear seam for the overlapping portions of neighboring images along which data for each of the neighboring images' overlap portions are similar and (b) overwrites at least some of each of the overlapping portions with data from the other overlapping portion to generate modified neighboring and partially overlapping images.

9. The method of claim 8, wherein the first neighboring images have first corresponding overlap portions, wherein the second neighboring images have second corresponding overlapping portions, wherein the third neighboring images have third corresponding overlap portions, and wherein the method further comprises one or more of (a), (b), or (c):
(a) before the applying of the seam algorithm to the first neighboring images, aligning the first corresponding overlap portions based on data of the first corresponding overlap portions to account for drift;
(b) before the applying of the seam algorithm to the second neighboring images, aligning the second corresponding overlap portions based on data of the second corresponding overlap portions to account for drift; and
(c) before the applying of the seam algorithm to the third neighboring images, aligning the third corresponding overlap portions based on data of the third corresponding overlap portions to account for drift.

10. A method comprising:
providing a plurality of images arranged in two or more rows and two or more columns, wherein neighboring images within the plurality of images partially overlap;
applying a seam algorithm to first neighboring images of the plurality of images along a first column of the two or more columns;
applying the seam algorithm to second neighboring images of the plurality of images along a second column of the two or more columns, wherein the second column neighbors the first column;
applying the seam algorithm to third neighboring images of the plurality of images along at least two neighboring rows within the first and second columns;

reapplying the seam algorithm to the first neighboring images; and reapplying the seam algorithm to the second neighboring images; and wherein the seam algorithm (a) uses an error minimization technique to identify a non-linear seam for the overlapping portions of neighboring images along which data for each of the neighboring images' overlap portions are similar and (b) overwrites at least some of each of the overlapping portions with data from the other overlapping portion to generate modified neighboring and partially overlapping images.

11. The method of claim 10, wherein the first neighboring images have first corresponding overlap portions, wherein the second neighboring images have second corresponding overlapping portions, wherein the third neighboring images have third corresponding overlap portions, and wherein the method further comprises one or more of (a), (b), or (c):

(a) before the applying of the seam algorithm to the first neighboring images, aligning the first corresponding overlap portions based on data of the first corresponding overlap portions to account for drift;

(b) before the applying of the seam algorithm to the second neighboring images, aligning the second corresponding overlap portions based on data of the second corresponding overlap portions to account for drift; and (c) before the applying of the seam algorithm to the third neighboring images, aligning the third corresponding overlap portions based on data of the third corresponding overlap portions to account for drift.

12. A system comprising:

a processor;

a primary memory component and a secondary memory component each coupled to the processor; and instructions provided to the primary memory component, wherein the instructions are executable by the processor to cause the system to perform a method comprising:

iteratively recalling pairs of images of a plurality of images arranged in two or more rows and two or more columns from the secondary memory component to the primary memory component, wherein each of the pairs of the first and second images are neighboring and partially overlapping;

performing on the primary memory component:

applying a seam algorithm to first neighboring images of the plurality of images along a first row of the two or more rows or a first column of the two or more columns, wherein the seam algorithm (a) uses an error minimization technique to identify a non-linear seam for the overlapping portions of neighboring images along which data for each of the neighboring images' overlap portions are similar and (b) overwrites at least some of each of the overlapping portions with data from the other overlapping portion to generate modified neighboring and partially overlapping images;

applying the seam algorithm to second neighboring images of the plurality of images along a second row of the two or more rows or a second column of the two or more columns, wherein the second row neighbors the first row or the second column neighbors the first column;

applying the seam algorithm to third neighboring images of the plurality of images along at least two neighboring columns within the first and second rows or along at least two neighboring rows within the first and second columns;

reapplying the seam algorithm to the first neighboring images;

reapplying the seam algorithm to the second neighboring images; and iteratively saving each pair of the modified neighboring and partially overlapping images to the secondary memory component.

13. The system of claim 12, wherein the overlapping portions are 15% or less of the area of a neighboring image.

14. The system of claim 12, wherein the plurality of images are part of a data set that comprises: scanning electron micrograph images, transmission electron micrograph images, optical micrograph images, geospatial images, aerial images, or satellite images.

15. The system of claim 12, wherein the plurality of images are part of a data set that comprises: optical images, infrared images, Doppler images, thermal images, x-ray images, magnetic resonance images, or ultrasound images.

16. The system of claim 12, wherein the plurality of images are part of a data set that comprises 100 or more images.

17. The system of claim 12, wherein the plurality of images are part of a data set that comprises 10,000 or more images.

18. The system of claim 12, wherein the method further comprises:

performing on the primary memory component:

before the applying of the seam algorithm, aligning the overlapping portions based on data of said portions to account for drift.

* * * * *